(No Model.)
F. W. MILLS.
CAR BRAKE.
No. 381,570. Patented Apr. 24, 1888.
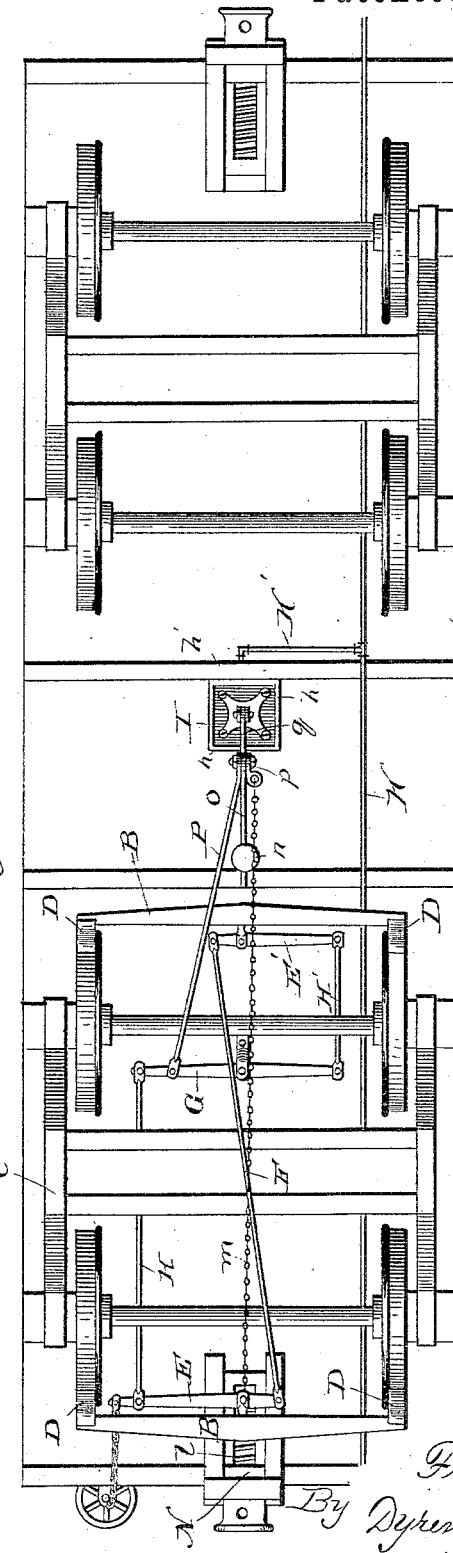
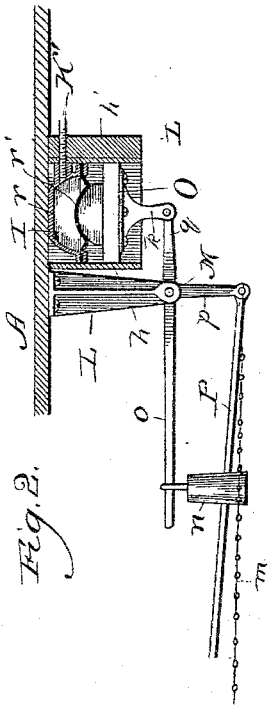
Witnesses:
Chas. E. Gaylord.
J. W. Dyrenforth.
Inventor:
Frank W. Mills,
By Dyrenforth & Dyrenforth,
Attys.

UNITED STATES PATENT OFFICE.

FRANK WM. MILLS, OF CHICAGO, ILLINOIS.

CAR-BRAKE.

SPECIFICATION forming part of Letters Patent No. 381,570, dated April 24, 1888.

Application filed August 16, 1887. Serial No. 247,062. (No model.)

*To all whom it may concern:*

Be it known that I, FRANK WILLIAM MILLS, a citizen of the United States, residing at Chicago, in the county of Cook and State of Illinois, have invented a new and useful Improvement in Car-Brakes, of which the following is a specification.

My invention relates particularly to the class of car-brake mechanisms in which the brakes have a normal tendency to be set or applied to the wheels, but are maintained "off" by the application of a pneumatic force.

My object is to provide means whereby the brakes on a train equipped with my improvement shall not be dependent for their release solely upon the application of the pneumatic force in the forward movement of the train, but only in the backward movement thereof.

To this end my invention consists in the general construction of my improvement; and it also consists in details of construction and combination of parts, all as hereinafter more fully set forth.

In the drawings, Figure 1 is a bottom plan view of a car provided with my improvement, and Fig. 2 a broken sectional side elevation of the same.

As illustrated, my improvement is shown to be combined only with the brake mechanism for the wheels on the truck at one end of the car. It will be understood, however, that it may be combined with the mechanism controlling the wheels on each truck by providing the usual connections for the purpose.

A is a railroad-car provided with an ordinary form of brake appliance, comprising brake-beams B at opposite ends of a truck, C, and carrying brake-shoes D; levers E and E', each pivotally connected to an adjacent brake-beam to produce a long and a short arm relatively on opposite sides of the fulcrum of the two levers, and having the short arms connected by a rod, F, and a centrally-pivoted lever, G, having one arm connected by a link, H', with the long arm of the lever E' and the other arm by a link, H, with the long arm of the lever E.

Pulling on the arm of the lever G, with which the long arm of the lever E is connected, sets the brakes, and, relaxing the strain upon the lever G, releases the brakes the brakeshoes falling away from the wheels by their own weight.

The setting and releasing of the brakes are produced by my improved mechanism for the purpose hereinafter described, which maintains the brakes normally set and releases them by the application of air-pressure.

I is a collapsible and expansible air-receiver comprising a body portion, $r$, resembling in form a dish, secured in inverted position on the bottom of the car, and covered by means of a flexible diaphragm, $r'$, secured at its edge to that of the part $r$ to render the space inclosed air-tight. An air-conduit, K, runs along the bottom of the car, to be coupled in the usual manner to similar conduits on adjacent cars, and thus communicate with the air-pump, of usual form for the purpose, on the locomotive, and a branch pipe, K', affords communication between the receiver and conduit.

L is a bracket or bearing extending downward from the bottom of the car, and to the bearing L, near its lower extremity, is pivoted at its angle a bell crank lever, M, having arms $q$ and $p$, and a longer arm, $o$, forming a backward extension of the arm $q$. The arm $o$ carries a weight, $n$, adjustable toward and from the fulcrum, and the arm $p$ is connected from its extremity by a flexible connecting medium— as a cable or chain, $m$—with the rear end of the draw-bar N, which is provided with the usual spring, $l$, and adapted to slide back and forth in the ordinary manner. The arm $q$ of the bell-crank M is connected from its extremity by a pivotal link, $k$, with a cross-head, O, vertically movable between guides $h$ and $h'$, extending from the bottom of the car, and the upper side of the cross-head is convex to fit into the receiver I and assist in thoroughly collapsing it when exhausted of its pneumatic contents, and afford the most advantageous form of bearing for the diaphragm when the receiver is expanded.

The operation of my device is as follows: The weight $n$ is adjusted upon the arm $o$ toward or from the fulcrum to exert any desired pressure, depending upon the weight of the car to be controlled by the brake mechanism, the weighted arm being of such a length that the weight $n$, when adjusted toward its extremity, will produce a proportionately greater strain than its own weight at the end of the arm $p$. This arm is connected by a rod, P, with the lever G in a manner to cause pulling force on the rod to set the brakes, such pulling force being exerted by the weight $n$ on the arm $o$ to turn the arm $p$ backward. Thus by means of the weight the brakes are normally set. To release them, it is necessary to force the arm $p$ in the opposite direction, which is done by pumping air into the receiver I to expand it, whereby it depresses the cross-head O to raise the weight $n$ and turn the arm $p$ forward. The same result is attained by the pulling out of the draw-bar N with the forward movement of the train, which, through the connecting medium $m$, pulls the arm $p$ in the same direction it is forced by expanding the receiver I; but I prefer to employ both the draw-bar connection and expanded receiver to release the brakes, since the former relieves the latter of strain and acts even in case of leakage of the air. The particular purpose, however, of the pneumatic mechanism in my improvement is to produce release of the brakes when it is desired to back the car. Manifestly, with only the draw-bar connection, as described, the backing of the train, which forces the draw-bar inward, would relax the chain $m$, and thus permit the weight $n$ to set the brakes, so that when it is desired to back to hold the brakes off the receiver must be expanded.

Obviously the receiver I could be arranged to be collapsed and expanded for its purpose laterally instead of vertically, and the device could be otherwise modified without departing from the spirit of my invention. I therefore do not limit myself to the exact form and arrangement of parts herein shown and described.

What I claim as new, and desire to secure by Letters Patent, is—

1. The combination, with the brake mechanism of a car, of a collapsible and expansible receiver, I, adapted to communicate with the air-pressure supply, a bell-crank lever, M, having a weighted arm, $o$, and arms $p$ and $q$, a cross-head, O, having a convex surface to engage with the diaphragm of the receiver I and pivotally connected with the arm $o$ of the bell-crank lever, and a rod, P, connecting the arm $p$ with the lever mechanism of the brakes, substantially as described.

2. The combination, with the brake mechanism and draw-bar of a car, of a collapsible and expansible receiver, I, adapted to communicate with the air-pressure supply, and a weighted bell-crank lever, M, having one arm connected with the sliding draw-bar and lever mechanism of the brakes and another arm connected with the said receiver, substantially as and for the purpose set forth.

3. The combination, with the brake mechanism and draw-bar of a car, of a collapsible and expansible receiver, I, adapted to communicate with the air-pressure supply, a bell-crank lever, M, carrying an adjustable weight, $n$, and having one arm connected with the said receiver, and a cable or chain, $m$, connecting another arm of the said lever M, which is connected with the brake mechanism, with the draw-bar, substantially as and for the purpose set forth.

4. The combination, with the brake mechanism and draw-bar of a car, of a collapsible and expansible receiver, I, adapted to communicate with the air-pressure supply, a bell-crank lever, M, having arms $p$ and $q$ connected, respectively, with the brake mechanism and receiver, and an arm, $o$, carrying an adjustable weight, $n$, and a cable or chain, $m$, connecting the arm $p$ with the sliding draw-bar, substantially as and for the purpose set forth.

5. The combination, with the brake mechanism and draw-bar of a car, of a collapsible and expansible receiver, I, adapted to communicate with the air-pressure supply, a bell-crank lever, M, having an arm, $o$, provided with an adjustable weight, $n$, and arms $p$ and $q$, a cross-head, O, having a convex surface in contact with the said receiver and movable in guides and pivotally connected with the arm $q$ of the bell-crank lever, a rod, P, and a chain or cable, $m$, connecting the arm $p$ of the bell-crank lever respectively with the brake mechanism and draw-bar, substantially as and for the purpose set forth.

FRANK WM. MILLS.

In presence of—
J. W. DYRENFORTH,
CHAS. E. GAYLORD.